United States Patent
Mae et al.

(10) Patent No.: US 7,507,387 B2
(45) Date of Patent: Mar. 24, 2009

(54) MICROREACTOR

(75) Inventors: Kazuhiro Mae, Kyoto (JP); Hideharu Nagasawa, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 676 days.

(21) Appl. No.: 10/855,980

(22) Filed: May 28, 2004

(65) Prior Publication Data
US 2005/0031507 A1    Feb. 10, 2005

(30) Foreign Application Priority Data
May 30, 2003 (JP) ............... 2003-154405
Jul. 1, 2003 (JP) ............... 2003-189658

(51) Int. Cl.
*B01J 19/00* (2006.01)
*B01J 19/24* (2006.01)
*B01F 5/00* (2006.01)

(52) U.S. Cl. .............. 422/224; 422/129; 422/130; 422/228; 366/341; 366/336

(58) Field of Classification Search .............. None
See application file for complete search history.

(56) References Cited

U.S. PATENT DOCUMENTS

| 2,890,868 A | * | 6/1959 | Potchen ............... 366/336 |
| 3,466,269 A |   | 9/1969 | Fivel |
| 3,831,907 A |   | 8/1974 | Claes |
| 3,949,970 A | * | 4/1976 | ter Braak ............... 366/339 |

FOREIGN PATENT DOCUMENTS

| DE | 3229486 A1 | * | 2/1984 |
| EP | 1 157 738 A2 |   | 11/2001 |
| GB | 2146912 A | * | 5/1985 |
| JP | 57-201519 A |   | 12/1982 |
| JP | 60-31329 U |   | 3/1985 |
| JP | 2002-282682 A |   | 10/2002 |
| JP | 2002-292274 A |   | 10/2002 |
| JP | 2003-502144 A |   | 1/2003 |
| WO | WO 99/44736 A1 |   | 9/1999 |
| WO | WO 00/62913 A1 |   | 10/2000 |
| WO | WO 00/78438 A1 |   | 12/2000 |
| WO | WO 01/36088 A1 |   | 5/2001 |
| WO | WO 02/089965 A1 |   | 11/2002 |

OTHER PUBLICATIONS

English Abstract and Machine Translation for EP 1 157 738 A2 (Nov. 28, 2001).*
Japanese Office Action for JPA 2003-189658 dated Apr. 11, 2008.

* cited by examiner

*Primary Examiner*—Jennifer A Leung
(74) *Attorney, Agent, or Firm*—Sughrue Mion, PLLC

(57) ABSTRACT

In a microreactor in which a plurality of fluids L1 and L2 are led through their respective feed channels to merge in one reaction channel and react with each other while circulating, a spiral reaction channel is formed by cutting a spiral screw thread on either the outer surface of a round-bar-shaped core member or the inner surface having a circular cross section of an outer cylindrical member and engaging the outer surface of the core member in close contact with the inner surface of the outer cylindrical member.

5 Claims, 6 Drawing Sheets

MICROREACTOR

BACKGROUND OF THE INVENTION

1. Field of the Invention

The present invention relates to a microreactor, and more particularly, to an apparatus which manufactures materials and products using a reaction of fluids in the field of chemical industry and pharmaceutical industry or more specifically, to a microreactor which leads a plurality of fluids through their respective fluid feed channels to merge in one reaction channel and causes these fluids to react with one another while circulating.

2. Description of the Related Art

In the chemical industry or pharmaceutical industry involved in manufacturing of chemicals and reagents, etc., the development of a new manufacturing process using a microcontainer called a "micromixer" or "microreactor" is underway in recent years. A micromixer or microreactor is provided with a microspace (reaction channel) having an equivalent diameter (circle-equivalent diameter) of approximately several μm to several hundred μm when their cross section is assumed to be a circle, connected to a plurality of micro fluid feed channels and leads a plurality of fluids through their respective fluid feed channels to merge in the microspace to thereby mix the plurality of fluids or cause the fluids to react with one another as well as the mixture. The micromixer and microreactor have basically a common structure, but one which mixes a plurality of fluids may be particularly called a "micromixer," while one whose mixture of a plurality of fluids is accompanied by a chemical reaction may be called a "microreactor."Therefore, suppose the microreactor according to the present invention includes the micromixer, too.

Such a microreactor is disclosed, for example, in PCT International Unexamined Patent Publication No. WO00/62913, National Publication of International Patent Application No. 2003-502144 or Japanese Patent Application Publication No. 2002-282682. All these microreactors lead two types of fluids through micro fluid feed channels as extremely thin laminar flows to a microspace, and mix and cause the two types of fluids to react with each other in the microspace.

Then, the difference between a reaction by the above described microreactor and a batch type mixture or reaction using a stirring tank, etc., will be explained. That is, a chemical reaction generally takes place when molecules meet together on an interface between reaction fluids, and therefore when a reaction takes place in a microspace, the area of the interface relatively increases and the reaction efficiency increases significantly. Furthermore, with regard to diffusion of molecules itself, the diffusion time is proportional to the square of the distance. This means that as the scale of the microspace is reduced, a mixture of fluids advances through diffusion of molecules without actively mixing the reaction fluids and a reaction is more likely to occur. Furthermore, the scale of the microspace is so small that the flow in the microspace is dominated by the laminar flow, and the fluids diffuse and react with each other in directions orthogonal to each other while flowing in a laminar flow state.

Compared to a conventional batch system using a large volume tank, etc., as a reaction field, the use of such a microreactor allows high accuracy control over the reaction time and reaction temperature between fluids. Furthermore, in the case of the batch system, a reaction advances on a reaction contact surface at the initial stage of a mixture between fluids whose reaction time is short and primary products generated by the reaction between the fluids further continue to be affected by reactions in the tank, and therefore there is a possibility that nonuniform reaction products may be produced. On the contrary, in the case of the microreactor, fluids hardly reside in a microspace but circulate continuously, and therefore primary products never continue to be affected by reactions in the microspace. Thus, it is also possible to extract pure primary products, which would be difficult in the prior arts.

Furthermore, when a small amount of chemical substances manufactured using experimental manufacturing equipment is manufactured in large quantity on an increased scale using large-scale manufacturing equipment, considerable time and manpower would be conventionally required to obtain reproducibility using batch type large-scale manufacturing equipment as opposed to experimental manufacturing equipment. However, based on a concept of numbering up with parallel manufacturing lines using a microreactor according to the amount of manufacturing, there is a possibility to drastically reduce time and manpower to obtain such reproducibility.

On the other hand, the microreactor handles various reactions including reactions at a low reaction rate and taking several tens of seconds to several minutes or a long time such as several hours to complete a reaction. Moreover, there are also reactions which advance in multiple stages and they also take a long reaction time. When the microreactor handles these reactions which take a long reaction time, it is necessary, from the standpoint of reaction control, to circulate fluids carrying out a reaction in the microreactor until the reaction is completed. Therefore, it is necessary to increase the volume of a reaction channel which constitutes a microspace of the microreactor so that the fluids reside for a long time. There are two types of concept when designing such a long residence time microreactor; one is a concept of securing the volume by increasing the cross-sectional area of the reaction channel and the other is a concept of securing the volume by lengthening the reaction channel. The former has a possibility of sacrificing the feature of the microreactor that the reaction channel should be a microspace, and therefore it is desirable to design the microreactor according to the concept of the latter. As a long residence time microreactor, for example, there is a proposal of forming a spiral reaction channel as disclosed in PCT International Publication No. WO 99/44736 or PCT International Publication No. WO02/089965.

However, with regard to the development of a long residence time microreactor with an extended reaction channel, no microreactor has been developed so far which could manufacture a reaction channel which constitutes a microspace easily and robustly and at the same time shorten its manufacturing period and reduce manufacturing cost. The reason is ascribable to the technology of manufacturing a microreactor; the microreactor requires special precision micro processing technology such as photolithography etching, electric discharge machining technology and stereo lithography method, etc., and takes a long manufacturing period and requires high manufacturing cost. Thus, it involves not only a problem that as the length of the reaction channel increases, the manufacturing period and manufacturing cost increase but also a problem that there is limitation to materials and machining dimensions handled by a special precision micro processing technology. On the other hand, attempting to manufacture a microreactor without using any special precision micro processing technology involves another problem that there is limitation to the width of the opening of a reaction channel that can be manufactured and it is not possible to manufacture a satisfactory microspace.

Furthermore, it is possible to realize a long residence time microreactor with an extended reaction channel by spirally winding a tube having an extremely small inner diameter, but lengthening the tube makes the tube easily bendable and causes the reaction channel to be clogged or makes the width of the opening of the reaction channel changeable, which makes it impossible to manufacture a robust apparatus and produces a problem with the accuracy of the apparatus.

SUMMARY OF THE INVENTION

The present invention has been implemented taking into account the above described circumstances and it is an object of the present invention to provide a microreactor capable of manufacturing a long reaction channel easily and robustly without requiring any special precision micro processing technology and shortening a manufacturing period and reducing manufacturing cost.

In order to attain the above described object, a first aspect of the present invention is a microreactor which leads a plurality of fluids through respective fluid feed channels of the fluids to merge in one reaction channel and causes the fluids to react with each other while circulating, wherein the reaction channel is formed as a spiral channel by cutting a spiral screw thread in any one of an outer surface of a round-bar-shaped core member and an inner surface having a circular cross section of an outer cylindrical member and engaging the outer surface of the core member in close contact with the inner surface of the outer cylindrical member.

Here, suppose the term "reaction" in the present invention also includes a reaction accompanied by a mixture. There are various types of reaction such as ion reaction targeting inorganic substances and organic substances, oxidation-reduction reaction, thermal reaction, catalyst reaction, radical reaction, polymerization reaction, etc. Furthermore, fluids include a liquid, a gas, a solid-liquid mixture with metal particles dispersed in a liquid, a solid-gas mixture with metal particles dispersed in a gas and a gas-liquid mixture with gas dispersed without being dissolved in a liquid, etc. A plurality of fluids include not only fluids having different types of fluid or different chemical compositions but also fluids having different states such as temperature and solid-liquid ratio.

The present invention is designed to form a reaction channel using a spiral screw structure and can form a spiral channel either by engaging an outer cylindrical member with an inner surface having a circular cross section in close contact with the outside of a round-bar-shaped core member on the outer surface of which a spiral screw is threaded or engaging a round-bar-shaped core member in close contact with the inside of a cylindrical member on the inner surface of which a spiral screw is threaded. Moreover, since it is also possible to perform threading for forming a microspace such as a reaction channel using a general machining technology such as a lathe, no special precision micro processing technology such as photolithography etching, electric discharge machining technology or stereo lithography method is required. This makes it possible to manufacture a long reaction channel easily and robustly without requiring any special precision micro processing technology and further shorten a manufacturing period and reduce a manufacturing cost. Of course, it is possible to manufacture a microdevice according to the present invention using a special precision micro processing technology such as photolithography etching, electric discharge machining technology and stereo lithography method, etc., or combine a machining technology with a precision micro processing technology.

A second aspect is the first aspect, characterized in that the spiral reaction channel has a multi-structure forming a plurality of reaction channels and the reaction channels are connected in series. This eliminates the need to increase the size of the microreactor itself considerably even when a reaction rate is low and a reaction time is long, requiring an extremely long reaction channel.

A third aspect is the first or second aspect, characterized in that the circle-equivalent diameter (Wa) in an average cross-sectional area in the diameter direction of the reaction channel is 1 μm or more and 1000 μm or less. This specifically expresses a preferable scale of the width of the opening of the reaction channel which constitutes a microspace with a circle-equivalent diameter.

A fourth aspect is any one of the first to third aspects, characterized in that when the fluid is circulated through the above described reaction channel so that a total flow rate of the fluid after a merge becomes Q ($m^3$/sec), the length PL (m) of the reaction channel is set so as to satisfy V/Q≧0.1, where V ($m^3$) is the volume of the reaction channel.

In manufacturing a long residence time microreactor, this shows a relationship between the volume V ($m^3$) of the reaction channel to secure the channel length PL (m) of a preferable reaction channel and a total fluid flow rate Q ($m^3$/sec) after the merge of a plurality of fluids and it is preferable to set the channel length PL (m) of the reaction channel so as to satisfy V/Q≧0.1.

Here, PL is calculated by the following formula:

$$PL(m) = V(m^3)/A(m^2) \qquad \text{[Formula 1]}$$

$$A = \sum_{i=1}^{n} Ai/n \qquad \text{[Formula 2]}$$

$$Ai = \pi \times [(1/2)Wi]^2 \qquad \text{[Formula 3]}$$

A fifth aspect is any one of the first to fourth aspects, characterized in that the start part or intermediate part of the reaction channel is provided with a mixing section formed into a channel structure where the plurality of fluids can be mixed. This makes it possible to speed up a reaction and carry out both mixture reaction and diffusion mixture gradually.

A sixth aspect is the fifth aspect, characterized in that the mixing section is made up of first convex sections protruding in a collar form from the inner surface of the outer cylindrical member in the diameter direction and second convex sections protruding in a collar form from the outer surface of the core member in the diameter direction arranged in a staggered configuration in the flow direction of the plurality of fluids. This shows a preferable mode of a channel structure where a plurality of fluids can be mixed and the plurality of fluids are mixed when the fluids pass through the first convex sections and second convex sections alternately to circulate in a meandering flow.

A seventh aspect is any one of the first to sixth aspects, characterized in that the plurality of fluid feed channels are formed into a multi-cylindrical structure. Forming the fluid feed channels into a multi-cylindrical structure causes the exit of the fluid feed channel to be directly connected to the start position of the reaction channel and thereby eliminates the need for a header section which is a space to guide a plurality of fluids to the start position of the reaction channel as in the case where the fluid feed channels are separately arranged. This prevents the plurality of fluids from reacting with one another before being merged in the reaction channel.

An eighth aspect of the present invention is any one of the first to seventh aspects, characterized by further comprising a temperature control device which controls the reaction temperature of the fluids that flow through the reaction channel. This makes it possible to adjust the reaction rate by adjusting the reaction rate according to the length of the reaction channel.

As explained above, according to the microreactor of the present invention, it is possible to manufacture a long reaction channel easily and robustly without requiring any special precision micro processing technology and at the same time shorten the manufacturing period and reduce manufacturing cost.

DETAILED DESCRIPTION OF THE PREFERRED EMBODIMENTS

With reference now to the attached drawings, an embodiment of the present invention will be explained below.

Figure 1:
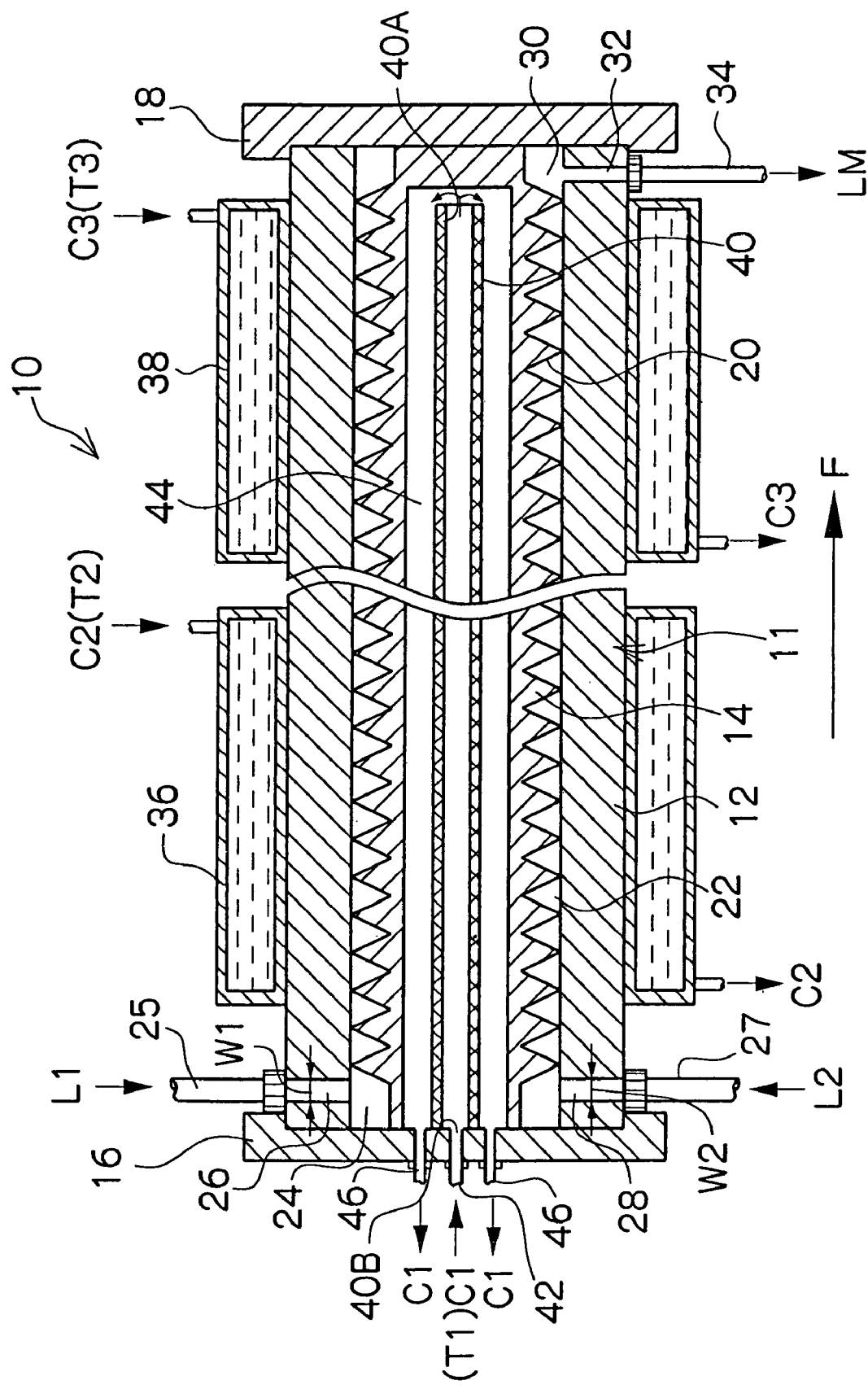
FIG. 1 is a cross-sectional view illustrating an overall configuration of a microreactor of the present invention.

FIG. 1 is a cross-sectional view illustrating an overall configuration of a microreactor 10 of the present invention and shows a case where two types of fluids L1 and L2 are made to react with each other.

As shown in FIG. 1, a reactor body 11 of the microreactor 10 is formed into a substantially cylindrical shape as a whole and configured of an outer cylindrical member 12 making up an outer shell of the apparatus, a round-bar-shaped core member 14 engaged in close contact with the inside of the outer cylindrical member 12 and first and second cover members 16 and 18, and a spiral screw 20 is threaded on the outer surface of the core member 14. In this way, a spiral microspace is formed between the outer cylindrical member 12 and the core member 14, which serves as a spiral reaction channel 22 where a plurality of fluids L1 and L2 are merged and react with each other. In this case, the outer surface of the core member 14 before the spiral screw 20 is threaded and the inner surface of the outer cylindrical member 12 which contacts the spiral screw 20 are preferably mirror-finished so that no gap is formed between the spiral screw 20 and the inner surface of the outer cylindrical member 12. This allows a reaction channel 22 of high sealing performance to be formed. As the material of a wetted section used for the microreactor 10, it is possible to use iron, aluminum, stainless steel, titanium, metal material such as various types of alloy, resin material such as fluorine resin and acrylic resin or glass material such as silicon and glass, and it is also possible to manufacture the microreactor 10 using a plurality of these materials. When designing the microreactor 10 of the present invention, it is possible to form the reaction channel 22 with reliable sealing performance by determining an engagement tolerance according to the materials of the core member 14 and outer cylindrical member 12.

Instead of threading the spiral screw 20 on the outer surface of the round-bar-shaped core member 14, it is also possible to thread the spiral screw 20 on the inner surface of the outer cylindrical member 12 to form the microreactor 10 of the present invention.

Furthermore, circular pipe-shaped fluid feed channels 26 and 28 connected to the start position of the reaction channel 22 are provided through a header section 24 where no spiral screw 20 is threaded on the first cover member 16 side of the outer cylindrical member 12 and fluid feed pipes 25 and 27 are connected to the respective fluid feed channels 26 and 28. Through these fluid feed pipes 25 and 27, the microreactor 10 is fed pressurized fluids L1 and L2 from two fluid feed sources (not shown) provided on the upstream side of the microreactor 10. In this case, as shown in the cross-sectional view of FIG. 2, it is preferable to form the fluid feed channels 26 and 28 into a multi-cylindrical structure in which the fluid feed channel 28 is arranged in a circular pipe shape around the fluid feed channel 26 as the center. In order to form the fluid feed channels 26 and 28 having the multi-cylindrical structure, a circular hole of the fluid feed channel 28 is perforated in the outer cylindrical member 12, a cylindrical divider plate 29 is placed in the hole and the divider plate 29 is fixed to the outer cylindrical member 12 by means of spacers 31. The number of multi-cylinders is not limited to two, but as many multi-cylinders as the fluids to be merged in the reaction channel 22 are formed. In this way, the fluid feed channels 26 and 28 are directly connected to the start point of the reaction channel 22 without passing through the header section 24, which eliminates the need for the header section 24 which would be required when the fluid feed channels 26 and 28 are provided separately. This prevents the fluids L1 and L2 from reacting with each other before being merged in the reaction channel 22. Furthermore, since the fluid feed channels 26 and 28 are formed into a multi-cylindrical structure, it is possible to form the fluids from the fluid feed channels 26 and 28 merged in the reaction channel 22 into a concentrically layered structure. This makes it possible to increase the area of the contact interface between the fluids L1 and L2 circulating as laminar flows within the reaction channel 22 and thereby further speed up the reaction.

Furthermore, by forming the fluids L1 and L2 circulating as laminar flows through the reaction channel 22 into a concentrically layered structure so as to prevent at least one of these fluids from involving a reaction of the other fluid, it is possible to increase/decrease the flow rate of the fluid not involving the reaction, allow the same microreactor to cover multiple types of reaction and condition changes and prevent any coagulation or precipitation generated by the reaction from sticking to the wall surface of the reaction channel 22 causing clogging in the reaction channel 22. For example, the laminar flow may be formed of three or more types of fluids, and of these fluids, a laminar flow not involving the reaction may be sandwiched between laminar flows formed by fluids involving the reaction. This makes it possible to use the fluid not involving the reaction as a reaction execution layer and the fluids involving the reaction and sandwiching the reaction execution layer as a pair of solute feeding layers to feed solutes which carry out the reaction. That is, it is possible to allow solutes diffused from the pair of solute feeding layers on both sides to react with the reaction execution layer subjected to an appropriate degree of dilution by the reaction execution layer. Therefore, it is possible to prevent coagulation generated when the solutes are allowed to react with each other under a high concentration condition and improve the uniformity of reaction products resulting from the reaction. Furthermore, when, for example, of the plurality of layered fluids (e.g., four fluids are layered), two fluids not involving the reaction are used as the laminar flow of fluids contacting the wall surface of the reaction channel 22, it is possible to prevent the coagulation or precipitation generated by the reaction from sticking to the wall surface of the reaction channel 22. Furthermore, when, of the plurality of layered fluids, the flow rate of the fluid not involving the reaction is increased/decreased, the thickness of the fluid involving the reaction becomes variable by that amount, and therefore it is possible to adjust a reaction completion time of the fluids involving the reaction.

Figure 2:
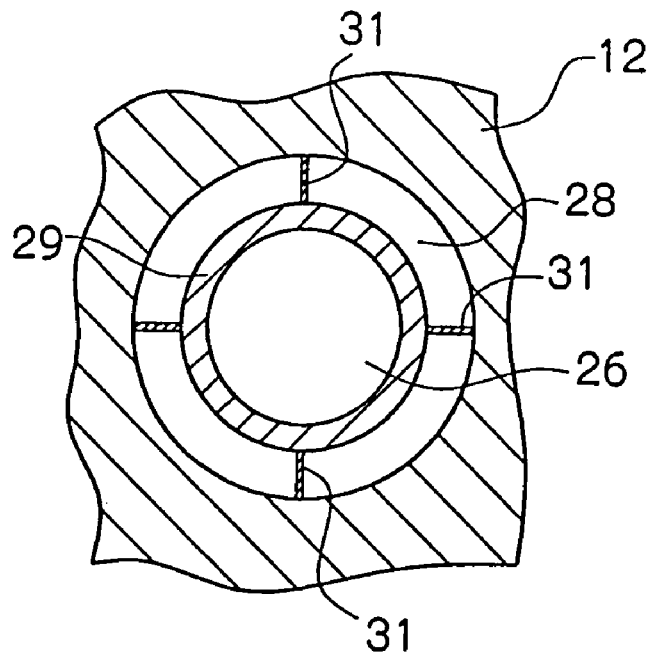
FIG. 2 is a cross-sectional view illustrating a fluid feed channel having a multi-cylindrical structure.

As shown in FIG. 1, the widths of the openings W1 and W2 of the fluid feed channels 26 and 28 are set as appropriate according to the feed rates and types of the fluids L1 and L2. These widths of the openings W1 and W2 specify the areas of openings in the diameter direction of the respective fluid feed channels 26 and 28 and the initial flow velocities of the plurality of fluids L1 and L2 introduced into the reaction channel 22 through the fluid feed channels 26 and 28 are determined according to these areas of openings and feed rates of the fluids L1 and L2. These widths of the openings W1 and W2 are set, for example, in such a way that the flow velocities of the fluids L1 and L2 introduced into the reaction channel 22 through the fluid feed channels 26 and 28 are the same. Therefore, as shown in FIG. 2, when the fluid feed channels 26 and 28 are formed into a multi-cylindrical structure, the area of the opening of the inner fluid feed channel 26 is preferably the same as the area of the opening of the outer fluid feed channel 28 so that the flow velocities of the respective fluid feed channels 26 and 28 become the same when they merge in the reaction channel 22.

Figure 3:
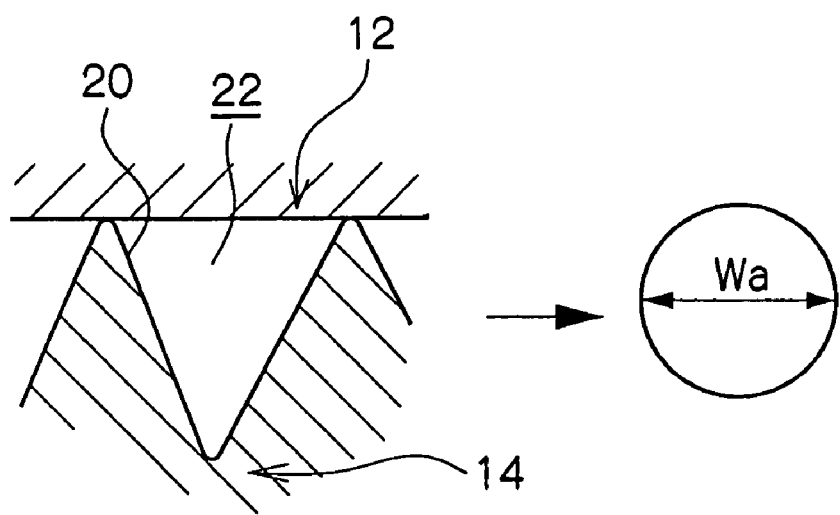
FIG. 3 is a cross-sectional view illustrating a circle-equivalent diameter of the reaction channel.

Furthermore, as shown in FIG. 3, the size of the opening of the reaction channel 22 is determined according to the feed rate and type, etc., of the fluid as appropriate in such a way that the circle-equivalent diameter Wa of the average cross-sectional area in the diameter direction (direction orthogonal to the flow direction of the fluid) of the reaction channel 22 is within a range of 1 μm or more and 1000 μm or less.

On the other hand, on the second cover member 18 side of the outer cylindrical member 12, a discharge channel 32 is perforated for a reaction fluid LM resulting from a reaction between the fluids L1 and L2 through a header section 30 where no spiral screw 20 is threaded and a discharge pipe 34 is connected to this discharge channel 32. The discharge pipe 34 is connected to another microreactor, etc., which carries out the next processing on the reaction fluid LM. In this way, while the plurality of fluids L1 and L2 which have flown through the fluid feed channels 26 and 28 and merged in the reaction channel 22 are circulating through the spiral reaction channel 22 in the direction indicated by arrow F in FIG. 1, the fluids L1 and L2 are diffused to react with each other and the reaction fluid LM is discharged out of the microreactor through the discharge channel 32.

When the microreactor 10 handles a reaction which takes a long reaction time, it is necessary, from the standpoint of reaction control, to circulate the fluids L1 and L2 which carry out the reaction within the reaction channel 22 until the reaction is completed and it is necessary to increase the volume of the reaction channel 22 and extend the residence time of the fluids L1 and L2. To design the channel length PL of the reaction channel 22 from such a standpoint, it is preferable to make the following setting. That is, when the fluids L1 and L2 are circulated through the reaction channel 22 in such a way that the total fluid flow rate after the merge of the fluids L1 and L2 becomes Q (m³/sec), the length PL (m) of the reaction channel 22 is set so as to satisfy V/Q≧0.1 where V (m³) is the volume of the reaction channel 22.

Figure 4:
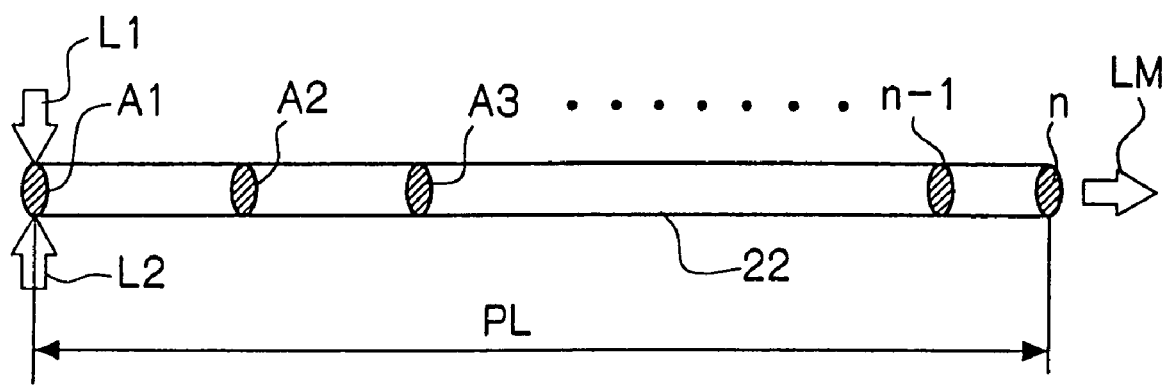
FIG. 4 illustrates a preferable channel length of the reaction channel.

Here, the channel length PL is calculated from the relationship between the volume V of the reaction channel 22 and average cross-sectional area A in formula (1) as is clear from FIG. 4 showing the spiral reaction channel 22 stretched into a rectilinear form, while the average cross-sectional area of the reaction channel 22 in formula (1) is calculated from formulae (2) and (3). Reference character Ai designates a cross-sectional area on each cross section of the reaction channel 22 and reference character Wi designates a circle-equivalent diameter on that cross section.

[Formula 4] (1)
$$PL(m) = V(m^3)/A(m^2)$$

[Formula 5] (2)
$$A = \sum_{i=1}^{n} Ai/n$$

[Formula 6] (3)
$$Ai = \pi \times [(1/2)Wi]^2$$

That is, the volume of the reaction channel 22 is set so that at least 10 sec can be secured as the residence time until the fluids L1 and L2 which have passed through the fluid feed channels 26 and 28 and merged in the reaction channel 22 are discharged from the discharge channel 32. Then, since the circle-equivalent diameter Wa of the reaction channel 22 needs to be set within a range of 1 μm or more and 1000 μm or less so as not to sacrifice the features of the microreactor 10, the channel length PL (m) of the reaction channel 22 is set so as to satisfy V/Q≧0.1 as described above for the circle-equivalent diameter Wa in this range.

Furthermore, as shown in FIG. 1, two jackets 36 and 38 in which thermal media C2 and C3 of a relatively great thermal capacity such as water and oil flow are wound around the reactor body 11 and the jackets 36 and 38 are connected to a thermal media feeding apparatus (not shown). The thermal media C2 and C3 which control reaction temperatures of the fluids L1 and L2 in the reaction channel 22 are supplied from the thermal media feeding apparatus to the jackets 36 and 38 and circulated into the thermal media feeding apparatus again. Temperatures T2 and T3 of the thermal media C2 and C3 to be supplied to the jackets 36 and 38 are preferably set according to the reaction temperature or the types of the fluids L1 and L2, etc., as appropriate and the temperatures T2 and T3 may also be changed. The core member 14 has a thin outer shell and is hollow inside and a thermal media feeding pipe 40 having a smaller inner diameter than the inner diameter of the core member 14 is fitted into the core member 14 from the base end side and the thermal media feeding pipe 40 is supported on the first cover member 16. An end opening 40A of the thermal media feeding pipe 40 reaches near the second cover member 18 and a feed opening 40B which feeds the thermal medium C1 into the core member 14 is open on the base end side of the thermal media feeding pipe 40 and a pipe 42 which penetrates the first cover member 16 and feeds the thermal media feeding pipe 40 with the thermal medium is connected to the feed opening 40B. Furthermore, a return channel 44 whereby the thermal medium flowing through the thermal media feeding pipe 40 returns is formed between the outer surface of the thermal media feeding pipe 40 and the hollow inner surface of the core member 14 and the return channel 44 is connected to thermal medium discharge pipes 46 which penetrate the first cover member 16. The thermal medium C1 having a temperature T1 is also supplied from the thermal media feeding apparatus to the thermal media feeding pipe 40 to control the reaction temperature. This makes it possible to control the reaction temperature, which is one of factors ruling the reaction, to a desired temperature and thereby control the reaction more accurately. Therefore, it is possible not only to obtain a desired reaction product but also to realize a faster reaction.

In the microreactor 10 in the above described configuration, the fluids L1 and L2 merged in the reaction channel 22 from the fluid feed channels 26 and 28 circulate without flowing backward or stagnating in one direction through the reaction channel 22 and molecules of the fluids L1 and L2 mutually diffuse and react with each other on the interface on which they contact with each other. In this way, the fluids L1 and L2 can complete a uniform reaction in a short time. Furthermore, since the microreactor 10 of the present invention uses the spiral and long reaction channel 22, and is thereby also applicable to reactions with a low reaction rate taking several tens of seconds to several minutes or even a long time of several hours.

Figure 5:
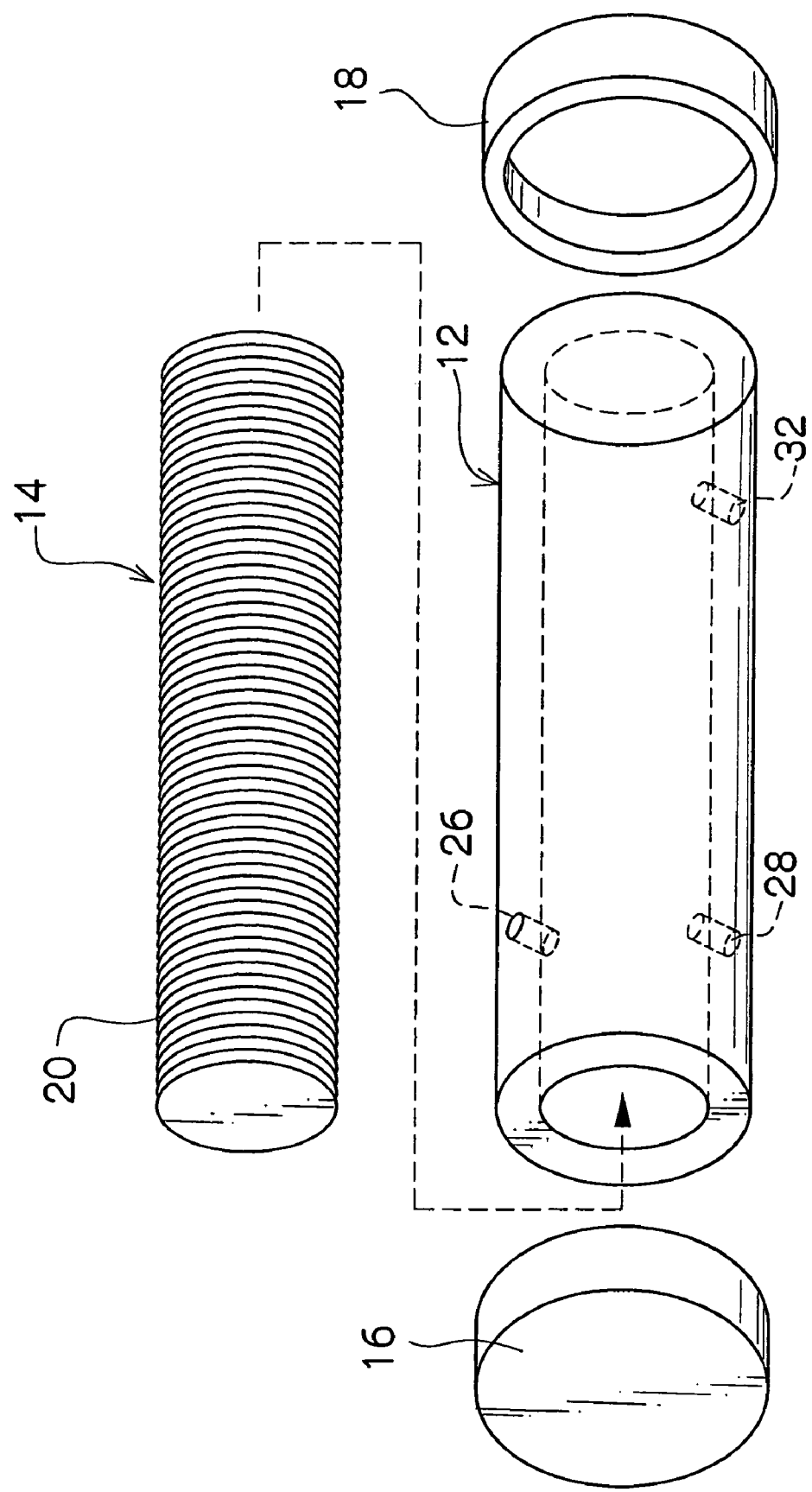
FIG. 5 is an exploded view of the microreactor of the present invention.

FIG. 5 is an exploded schematic view of the microreactor 10 in the above configuration before being assembled and the channel of the thermal medium C1 formed in the core member 14, etc., is omitted.

To assemble the microreactor 10, the outer cylindrical member 12 having a cylindrical shape is engaged in close contact with the outside of the core member 14 on which the spiral screw 20 is threaded and both side ends are covered with a pair of cover members 16 and 18 in this condition. By so doing, the microreactor 10 can be easily manufactured. Moreover, threading for forming a microspace such as the reaction channel 22 can be realized through a general machining technology using a lathe, etc., and requires no special precision micro processing technology such as photolithography etching, electric discharge machining technology or stereo lithography method. This makes it possible to manufacture the reaction channel 22 of a long channel length PL easily and robustly without requiring any special precision micro processing technology. Moreover, it is also possible to shorten the manufacturing period or reduce the manufacturing cost. Actually when the microreactor 10 of the present invention was manufactured using a stainless steel round bar as the core member 14 around which the spiral screw 20 is threaded, using acrylic resin as the outer cylindrical member 12 and using a lathe (general machining technology), it was possible to manufacture the microreactor 10 having a long channel length PL of 16.5 m capable of securing a long resident time with V/Q of 585 sec, when a circle-equivalent diameter Wa of the reaction channel 22 was 950 µm and Q was 0.02 mL/sec.

Furthermore, in the microreactor 10 in which the spiral reaction channel 22 is formed using the spiral screw structure of the present invention can handle various types of reaction with different reaction rates and various reaction conditions by only changing the cutting length of the spiral screw 20. For example, when the length of the reaction channel 22 needs to be extended, this change can be realized by simply increasing the thickness of the core member 14 or outer cylindrical member 12 or narrowing the threading pitch of the spiral screw 20 without the need to lengthen the microreactor itself. This makes it possible not only to drastically expand the types of reactions applicable to the microreactor 10 but also to even downsize the long residence time microreactor 10.

Figure 6A:
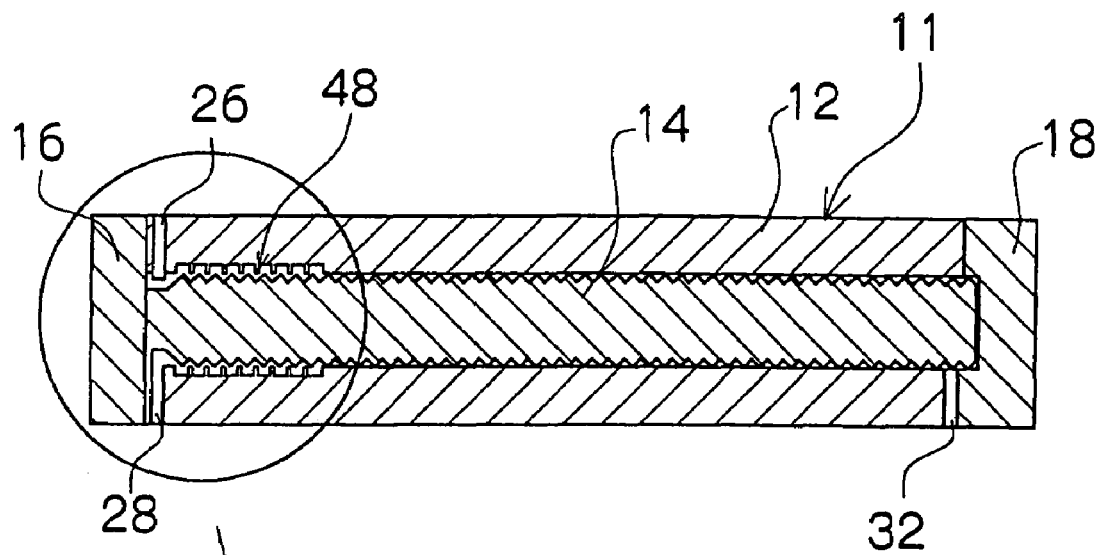
FIG. 6A and FIG. 6B are cross-sectional views illustrating a mixing section provided for the reaction channel.
Figure 6B:
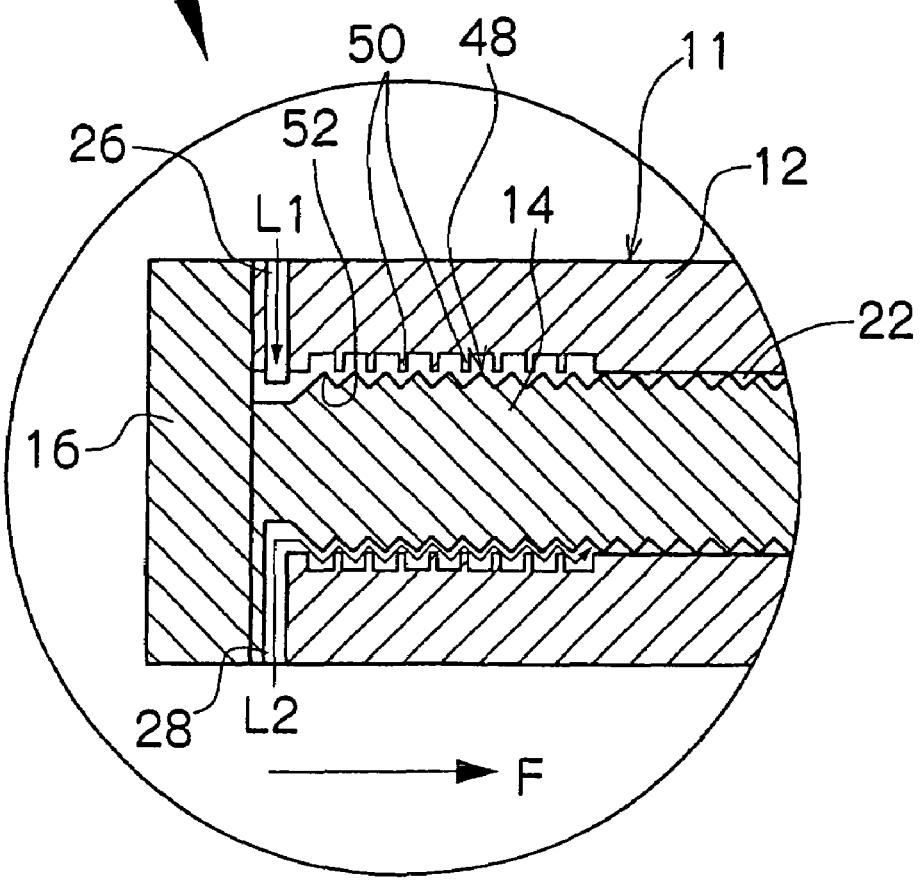

FIG. 6A shows a mode of the present invention provided with a mixing section 48 in the start section of the reaction channel 22, formed into a channel structure where the fluids L1 and L2 can be mixed and FIG. 6B is an enlarged view of the encircled part in FIG. 6A. The mixing section 48 forms a gap between the inner surface of the outer cylindrical member 12 and the outer surface of the core member 14 and forms first convex sections 50 protruding in a collar form from the inner surface of the outer cylindrical member 12 in the diameter direction and second convex sections 52 protruding in a collar form from the outer surface of the core member 14 in the diameter direction arranged in a staggered configuration in the flow direction of the fluids L1 and L2. The second convex sections 52 use the spiral screw 20 formed in the core member 14. Furthermore, the location at which the mixing section 48 is provided is not limited to the start section of the reaction channel 22 but the location may also be an intermediate position of the reaction channel 22.

Since a reaction takes place when reaction substances (molecules) meet one another, a mixture of the fluids L1 and L2 to be subjected to the reaction is one of important factors ruling the reaction. Therefore, by adding the mixing section 48 having a mixture promoting function to the microchannel structure after introducing the fluids L1 and L2 from the fluid feed channels 26 and 28 into the reaction channel 22, it is possible to speed up the reaction. Furthermore, the present invention is also applicable to reactions whereby, for example, a fluid including substance A and a fluid including substance B are subjected to a mixture and reaction to produce primary products including substances C and D, these substances C and D are subjected to a reaction through diffusion to synthesize substance E, that is, a reaction requiring both mixture reaction and diffusion reaction.

Figure 7:
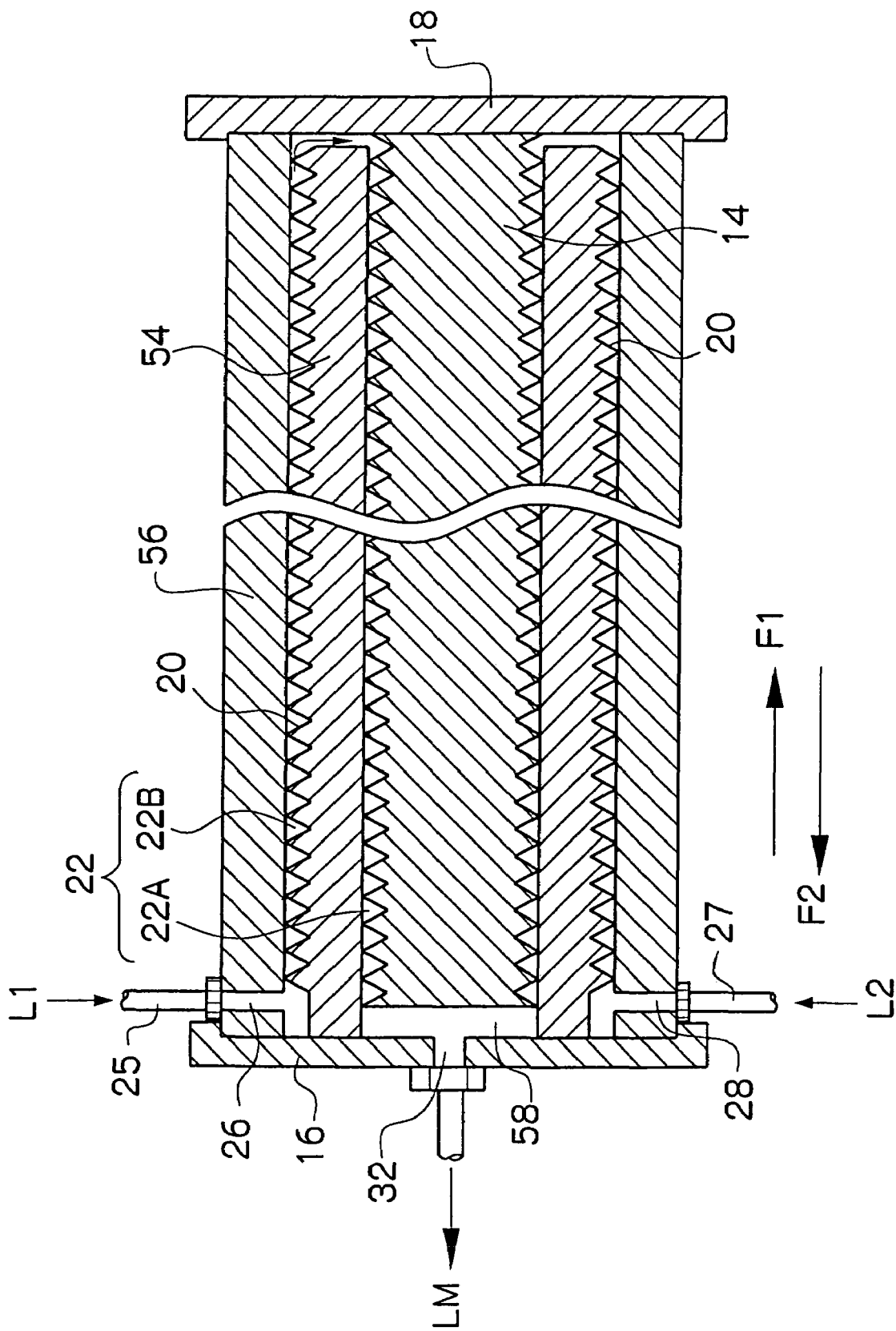
FIG. 7 is a cross-sectional view illustrating a microreactor whose reaction channel has a multi-structure.

FIG. 7 shows the spiral reaction channel 22 formed into a multi-structure, where a plurality of reaction channels 22A and 22B are formed and these reaction channels 22A and 22B are connected in series. Here, the channel of the thermal medium C1 formed in the core member 14 and jackets 36 and 38 are omitted. Furthermore, the same members as those in FIG. 1 will be explained with the same reference numerals assigned.

In order to manufacture the microreactor 10 whose reaction channels 22A and 22B constitute a multi-structure, an outer cylindrical member 54, on the outer surface the spiral screw 20 is threaded is engaged in close contact with a core member 14 and a cylindrical member 56 through which fluid feed channels 26 and 28 are perforated is engaged in close contact with the outside of the outer cylindrical member 54. Then, one end of the cylindrical member 56 is covered with a first cover member 16 through which a discharge channel 32 is perforated and the other end is covered with a second cover member 18. In this way, it is possible to manufacture the microreactor 10 whose reaction channels 22A and 22B constitute a double structure. In this case, a header section 58 which guides a reaction fluid LM from a reaction channel 22 to the discharge channel 32 is provided between the first cover member 16 and the end face of the core member 14.

According to the microreactor 10 in the above described configuration, fluids L1 and L2 supplied from the fluid feed channels 26 and 28 flow through an outer reaction channel 22B in the direction indicated by arrow F1, turns the direction to an inner reaction channel 22A near the second cover member 18, flows through the inner reaction channel 22A in the direction indicated by arrow F2 and is discharged from the discharge channel 32 through the header section 58. In this way, the present invention is also applicable to the case where the reaction rate is low and a reaction takes a long time, thus requiring an extremely long reaction channel 22, without the need to upsize the microreactor 10 significantly. Furthermore, when it is preferred to adopt a triple structure for the reaction channel 22, it is possible to easily expand the structure using two outer cylindrical members 54, on the outer surface of which the spiral screw 20 is threaded. FIG. 7 shows the case using the outer cylindrical member 54, on the outer surface of which the spiral screw 20 is threaded, but it is also possible to manufacture the microreactor 10 whose reaction channels 22A and 22B constitute a multi-structure by engaging the cylindrical member 56, on the inner surface of which the spiral screw 20 is threaded in close contact with the outside of the cylindrical member 12 in FIG. 1 with no spiral screw 20.

This embodiment has described the case using two fluids L1 and L2 as an example, but the number of the fluids is not limited to two and may also be three or more. Furthermore, when three or more fluids are used, the same types of fluid may be included.

EXAMPLE

A reaction was produced on a diketopyrrol pigment using a spiral screw type microreactor 10 (circle-equivalent diameter Wa of the reaction channel 22 is 950 μm) as shown in FIG. 1.

As the thermal medium C1, silicon oil heated to 110° C. was circulated for reaction temperature control, and a t-amyl oxalate solution (prepared by introducing 12.4 g of sodium into 136.5 g of an anhydrous t-amyl alcohol at 100° C.) as the fluid L1 and a t-amyl alcohol mixed solution of p-chlorobenzonitrile and diisopropyl succinate (prepared by heating 30.0 g of p-chlorobenzonitrile and 32.9 g of diisopropyl succinate together with 80 g of t-amyl alcohol to 90° C.) as the fluid L2. The fluids were fed using a piston pump at flow velocities of 6 ml/min (L1) and 3 ml/min (L2) respectively. The pigment which is the reaction fluid LM was output from a discharge port 34 and then poured into 80° C. hot water. The pigment suspension was filtered by means of suction, cleaned with methanol and then neutral-cleaned with water. The water-containing red pigment obtained was dried at 80° C. The pigment conversion yield was 93%. Furthermore, the coating agent with AM varnish had a color with high shielding performance.

What is claimed is:

1. A microreactor which leads a plurality of fluids through respective fluid feed channels of the fluids to merge in one reaction channel and causes the fluids to react with each other while circulating, said microreactor comprising:

a round-bar-shaped core member of which outer surface has a circular cross section;

a first cylindrical member of which inner and outer surfaces have circular cross sections, said round-bar-shaped core member being inserted in said first cylindrical member; and a second cylindrical member of which inner surface has a circular cross section, said first cylindrical member being inserted in said second cylindrical member, wherein a reaction channel is formed as first and second spiral channels connected in series, said first spiral channel being formed by cutting a first spiral screw in any one of the outer surface of said round-bar-shaped core member and the inner surface of said first cylindrical member and engaging the outer surface of said core member in contact with the inner surface of said first cylindrical member, said second spiral channel being formed by cutting a second spiral screw in any one of the outer surface of said first cylindrical member and the inner surface of said second cylindrical member and engaging the outer surface of said first cylindrical member in contact with the inner surface of said second cylindrical member, wherein a start part or intermediate part of said reaction channel is provided with a mixing section formed into a channel structure where said plurality of fluids can be mixed, and wherein said mixing section is made up of first convex sections protruding in a collar form in the diameter direction and second convex sections protruding in a collar form in the diameter direction arranged in a staggered configuration in the flow direction of said plurality of fluids.

2. The microreactor according to claim 1, wherein the circle-equivalent diameter (Wa) in an average cross-sectional area in the diameter direction of said reaction channel is 1 μm or more and 1000 μm or less.

3. The microreactor according to claim 1, wherein when the fluid is circulated through said reaction channel so that a total flow rate of the fluid after a merge becomes Q (m$^3$/sec), the length PL (m) of the reaction channel is set so as to satisfy V/Q≧0.1, where V (m$^3$) is the volume of the reaction channel.

4. The microreactor according to claim 1, wherein said plurality of fluids feed channels are formed into a multi-cylindrical structure.

5. The microreactor according to claim 1, further comprising a temperature control device which controls the reaction temperature of the fluids that flow through said reaction channel.

* * * * *